(12) United States Patent
Dinerstein

(10) Patent No.: US 10,313,369 B2
(45) Date of Patent: Jun. 4, 2019

(54) BLOCKING MALICIOUS INTERNET CONTENT AT AN APPROPRIATE HIERARCHICAL LEVEL

(71) Applicant: SYMANTEC CORPORATION, Mountain View, CA (US)

(72) Inventor: Jonathan J. Dinerstein, Draper, UT (US)

(73) Assignee: SYMANTEC CORPORATION, Mountain View, CA (US)

( * ) Notice: Subject to any disclaimer, the term of this patent is extended or adjusted under 35 U.S.C. 154(b) by 135 days.

(21) Appl. No.: 15/716,909

(22) Filed: Sep. 27, 2017

(65) Prior Publication Data

US 2019/0098023 A1 Mar. 28, 2019

(51) Int. Cl.
*H04L 29/06* (2006.01)
*G06F 21/50* (2013.01)

(52) U.S. Cl.
CPC .......... *H04L 63/1416* (2013.01); *G06F 21/50* (2013.01); *H04L 63/20* (2013.01); *H04L 63/1433* (2013.01); *H04L 63/1483* (2013.01)

(58) Field of Classification Search
None
See application file for complete search history.

(56) References Cited

U.S. PATENT DOCUMENTS

| | | | | |
|---|---|---|---|---|
| 7,735,116 B1 * | 6/2010 | Gauvin | ................. | G06F 21/552 713/153 |
| 2017/0214709 A1 * | 7/2017 | Maestas | .............. | H04L 63/1433 |
| 2017/0220964 A1 * | 8/2017 | Datta Ray | ........... | H04L 63/1433 |

OTHER PUBLICATIONS

United States Patent and Trademark Office; International Search Report and Written Opinion; issued in PCT Application No. PCT/US2018/038615; dated Sep. 10, 2018; 7 pages.
U.S. Appl. No. 15/254,748, titled System and Method for Hierarchical and Chained Internet Security Analysis, filed Sep. 1, 2016, 54 pages.
U.S. Appl. No. 62/341,512, titled System and Method for Hierarchical and Chained Internet Security Analysis, filed May 25, 2016, 21 pages.

* cited by examiner

*Primary Examiner* — Henry Tsang
(74) *Attorney, Agent, or Firm* — Maschoff Brennan

(57) ABSTRACT

Blocking malicious Internet content at an appropriate hierarchical level. In one embodiment, a method may include identifying evidence of security risks in hierarchical levels of an Internet hierarchy. The method may also include generating security risk scores for the hierarchical levels of the Internet hierarchy based on the evidence of security risks. The method may further include identifying a security risk threshold. The method may also include identifying, as an appropriate blocking level, the highest hierarchical level of the Internet hierarchy having a security risk score at or above the security risk threshold. The method may further include blocking a network device from accessing Internet content in the Internet hierarchy at or below the appropriate blocking level.

20 Claims, 4 Drawing Sheets

BLOCKING MALICIOUS INTERNET CONTENT AT AN APPROPRIATE HIERARCHICAL LEVEL

BACKGROUND

Malicious Internet content is content on the Internet that, when accessed by a network device, behaves maliciously. For example, malicious Internet content may include malware that a malicious website attempts to install onto a network device. This malware may be configured, for example, to disrupt operation of the network device, gather personal information from the network device, or gain total access to the network device. The installation of malware from a malicious website may require some action on the part of the user of the network device. However, some malicious websites will attempt to automatically install malware on a network device without any action beyond the network device accessing the malicious website. To avoid being automatically impacted by simply accessing a website having malicious Internet content, one technique for dealing with malicious Internet content is to block network devices from accessing particular websites that are suspected of hiding malicious Internet content.

Unfortunately, however, malicious actors have become increasingly adept at hiding malicious Internet content. For example, malicious actors may hide malicious Internet content on compromised Domains, may randomly generate new Domains, or may randomly change URLs. Also, the scope of the malicious Internet content varies from one malicious actor to the next. As a result, sufficient direct evidence of malicious Internet content is not always available to effectively assess security risks and block a network device from accessing malicious Internet content, thereby putting network devices at risk from malicious Internet content.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for blocking malicious Internet content at an appropriate hierarchical level may be performed, at least in part, by a computing device including at least one processor. The method may include identifying evidence of security risks in hierarchical levels of an Internet hierarchy. The method may also include generating security risk scores for the hierarchical levels of the Internet hierarchy based on the evidence of security risks. The method may further include identifying a security risk threshold. The method may also include identifying, as an appropriate blocking level, the highest hierarchical level of the Internet hierarchy having a security risk score at or above the security risk threshold. The method may further include blocking a network device from accessing Internet content in the Internet hierarchy at or below the appropriate blocking level.

In another embodiment, a computer-implemented method for blocking malicious Internet content at an appropriate hierarchical level may be performed, at least in part, by a computing device including at least one processor. The method may include identifying a base hierarchical level of the Internet hierarchy that has a potential security risk. The method may also include identifying direct evidence of security risks in the base hierarchical level and other hierarchical levels of the Internet hierarchy that are higher than and/or lower than the base hierarchical level. The method may further include generating indirect evidence of security risks in the base hierarchical level and other hierarchical levels. The method may also include combining the direct and indirect evidence of security risks in the base hierarchical level and other hierarchical levels into combined evidence of security risks. The method may further include generating security risk scores for the hierarchical levels of the Internet hierarchy based on the combined evidence of security risks. The method may also include identifying a security risk threshold. The method may further include identifying, as an appropriate blocking level, the highest hierarchical level of the Internet hierarchy having a security risk score at or above the security risk threshold. The method may also include blocking a network device from accessing Internet content in the Internet hierarchy at or below the appropriate blocking level.

In some embodiments, the hierarchical levels of the Internet hierarchy may include Top Level Domain (TLD), Autonomous System Number (ASN), Classless Inter-Domain Routing (CIDR) Range, Internet Protocol (IP) address, Domain, Host, Path, and File. Also, in some embodiments, the generating of the security risk scores for the hierarchical levels of the Internet hierarchy may be accomplished using machine learning. Further, in some embodiments, the method may also include weighting the indirect evidence of security risks based on the hierarchical level to which the indirect evidence corresponds. In these embodiments, the indirect evidence corresponding to higher hierarchical levels of the Internet hierarchy may be weighted lower than the indirect evidence corresponding to lower hierarchical levels of the Internet hierarchy. Also, in these embodiments, the weighting of the indirect evidence of security risks may be accomplished using machine learning. Also, in some embodiments, the identifying of the direct evidence of security risks may include identifying the direct evidence of security risks in one or more of telemetry data, traffic log data, and historical tracking data.

Also, in some embodiments, one or more non-transitory computer-readable media may include one or more computer-readable instructions that, when executed by one or more processors, cause the one or more processors to perform a method for blocking malicious Internet content at an appropriate hierarchical level.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
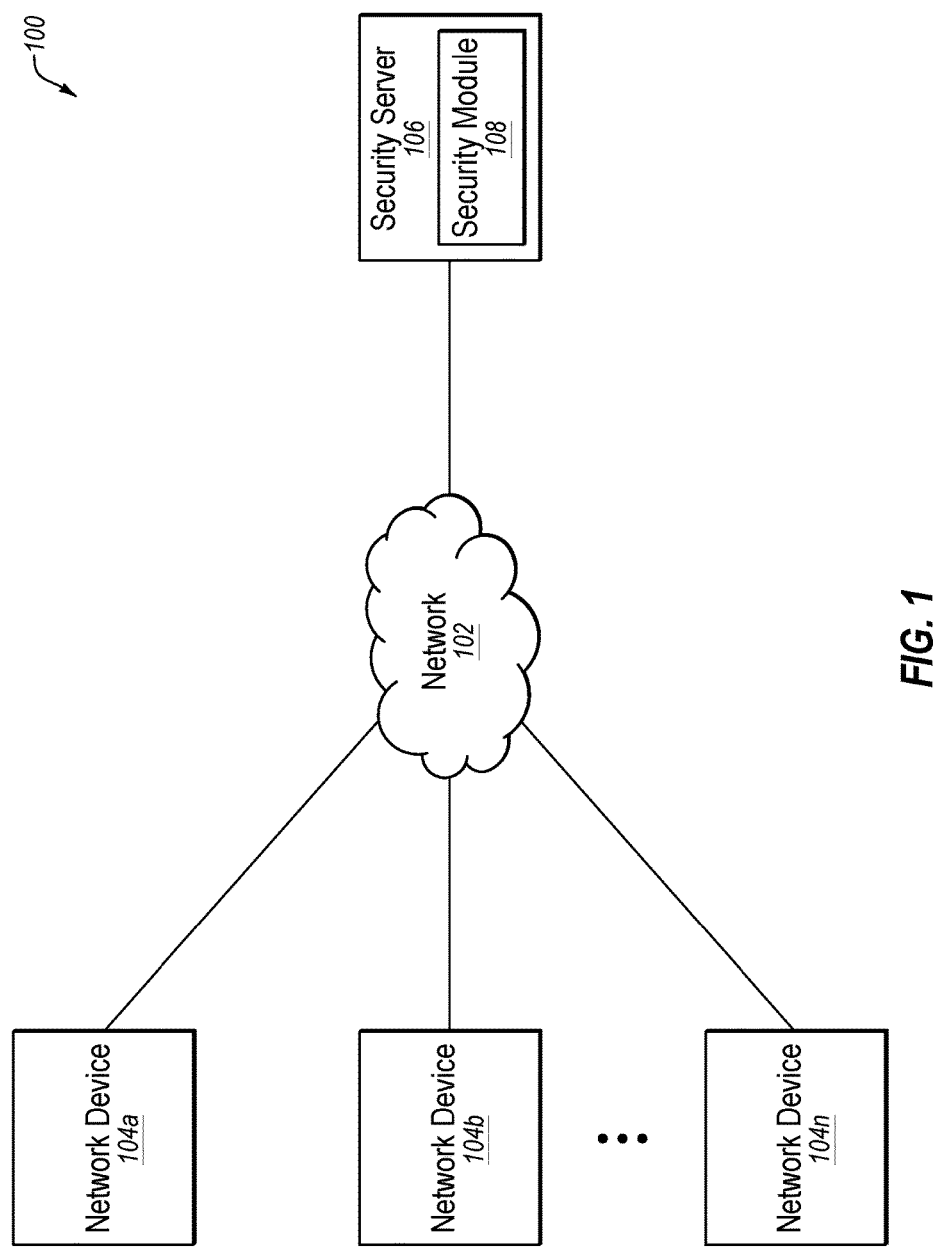
FIG. 1 illustrates an example system configured for blocking malicious Internet content at an appropriate hierarchical level.

Although it may be important to block a network device from accessing malicious Internet content, such blocking may be difficult to effectively perform due to malicious actors having become increasingly adept at hiding malicious Internet content.

One difficulty in blocking access to malicious Internet content relates to blocking at the appropriate hierarchical level of an Internet hierarchy. For example, an Internet hierarchy may include the following hierarchical levels having different levels of granularity, from highest (course-grain) to lowest (fine-grain): Top Level Domain (TLD), Autonomous System Number (ASN), Classless Inter-Domain Routing (CIDR) Range, Internet Protocol (IP) address, Domain, Host, Path, and File. Conventional technology may only evaluate Internet security risks at a single hierarchical level, such as at the File level or the Domain level. However, blocking Internet content at only a single hierarchical level may result in over-blocking (e.g., an entire Domain may not need to be blocked when only a single webpage of a Host on the Domain is malicious) and thereby potentially preventing network devices from accessing benign Internet content. Similarly, blocking Internet content at only a single hierarchical level may result in under-blocking (e.g., blocking a single malicious file may be insufficient when the entire Domain of the single malicious file is also malicious) and thereby potentially putting network devices at risk from undetected malicious Internet content.

Another difficulty in blocking access to malicious Internet content relates to blocking at the appropriate hierarchical level of an Internet hierarchy even where no direct evidence of malicious Internet content exists. For example, conventional technology may only analyze security risks of a particular hierarchical level based on direct evidence. Where no direct evidence of security risks exists for a particular hierarchical level of an Internet hierarchy, that particular level may not be analyzed. For example, where there is direct evidence regarding the level of maliciousness at a File hierarchical level, but there is no direct evidence regarding the security risks for the Domain hierarchical level to which the File hierarchical level corresponds, then the Domain may go unanalyzed by conventional technology, thereby potentially putting network devices at risk from undetected malicious Internet content at the Domain hierarchical level.

Some embodiments disclosed herein may block malicious Internet content at an appropriate hierarchical level. For example, some embodiments may include identifying evidence of security risks in multiple hierarchical levels of an Internet hierarchy, generating security risk scores for the hierarchical levels based on the evidence, and then blocking a network device from accessing Internet content in the Internet hierarchy at or below the highest hierarchical level of the Internet hierarchy having a security risk score at or above a security risk threshold. By thus blocking malicious Internet content at an appropriate hierarchical level, over-blocking and under-blocking can be avoided, thus allowing the network device to access benign Internet content and blocking the network device from accessing malicious Internet content.

Further, the embodiments disclosed herein may block malicious Internet content at an appropriate hierarchical level using both indirect and direct evidence. For example, some embodiments may include identifying a base hierarchical level of the Internet hierarchy that has a potential security risk, identifying direct evidence of security risks in the base hierarchical level and other hierarchical levels of the Internet hierarchy, and then generating indirect evidence of security risks in the base hierarchical level and other hierarchical levels. This direct and indirect evidence of security risks may then be combined into combined evidence of security risks, security risk scores for the hierarchical levels may be generated based on the combined evidence, and a network device may be blocked from accessing Internet content in the Internet hierarchy at or below the highest hierarchical level of the Internet hierarchy having a security risk score at or above a security risk threshold. By thus blocking malicious Internet content at an appropriate hierarchical level using both indirect and direct evidence, even hierarchical levels of an Internet hierarchy having no direct evidence may be analyzed, thus allowing blocking at these hierarchical levels where appropriate.

Turning to the figures, FIG. 1 illustrates an example system 100 configured for blocking malicious Internet content at an appropriate hierarchical level. The system 100 may include a network 102, network devices 104a-104n, and a security server 106.

In some embodiments, the network 102 may be configured to communicatively couple the network devices 104a-104n to one another as well as to the security server 106. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
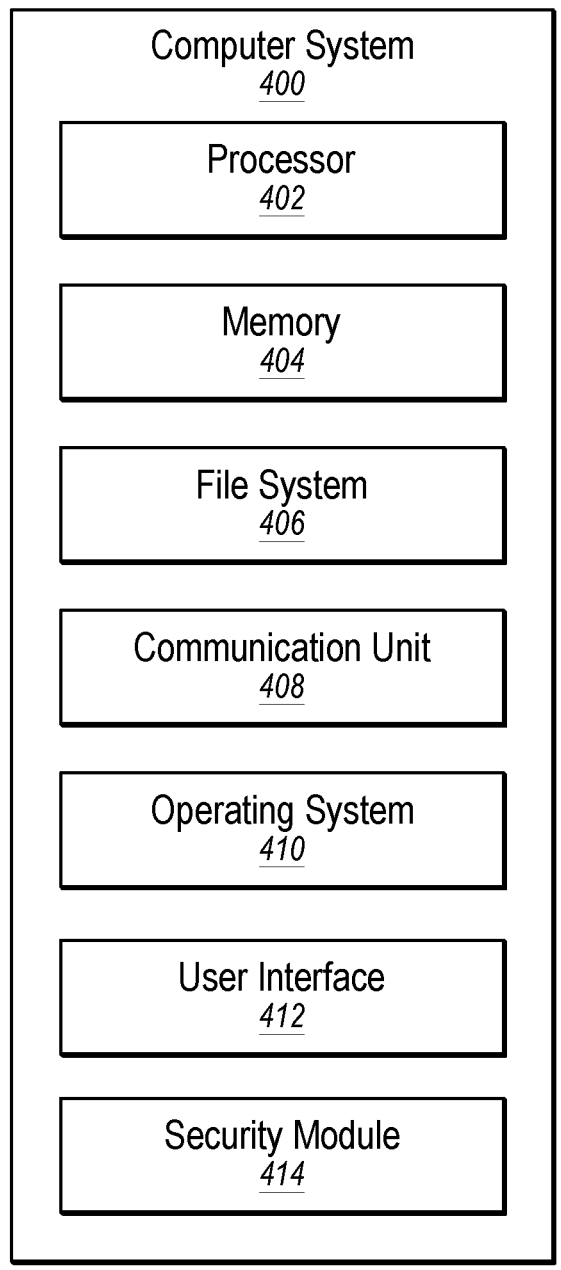
FIG. 4 illustrates an example computer system that may be employed in blocking malicious Internet content at an appropriate hierarchical level.

In some embodiments, each of the network devices 104a-104n may be any computer system capable of communicating over the network 102, examples of which are disclosed herein in connection with the computer system 400 of FIG. 4.

In some embodiments, the security server 106 may be any computer system capable of communicating over the network 102 and capable of monitoring the network devices 104a-104n, examples of which are disclosed herein in connection with the computer system 400 of FIG. 4. In some embodiments, the security server 106 may be employed by an organization that manages the network 102 and the network devices 104a-104n. In some embodiments, the security server 106 may include a security module 108 that may be configured to block malicious Internet content at an appropriate hierarchical level, as disclosed in greater detail in connection with FIGS. 2 and 3 herein. In some embodiments, the security module 108 may include, or have access to, training data and/or machine learning classifiers. In some embodiments, the security module 108 may include, or be part of, a secure web gateway, such as Symantec's ProxySG secure web gateway solution and/or Symantec's Dynamic Real-Time Rating (DRTR) service.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2:
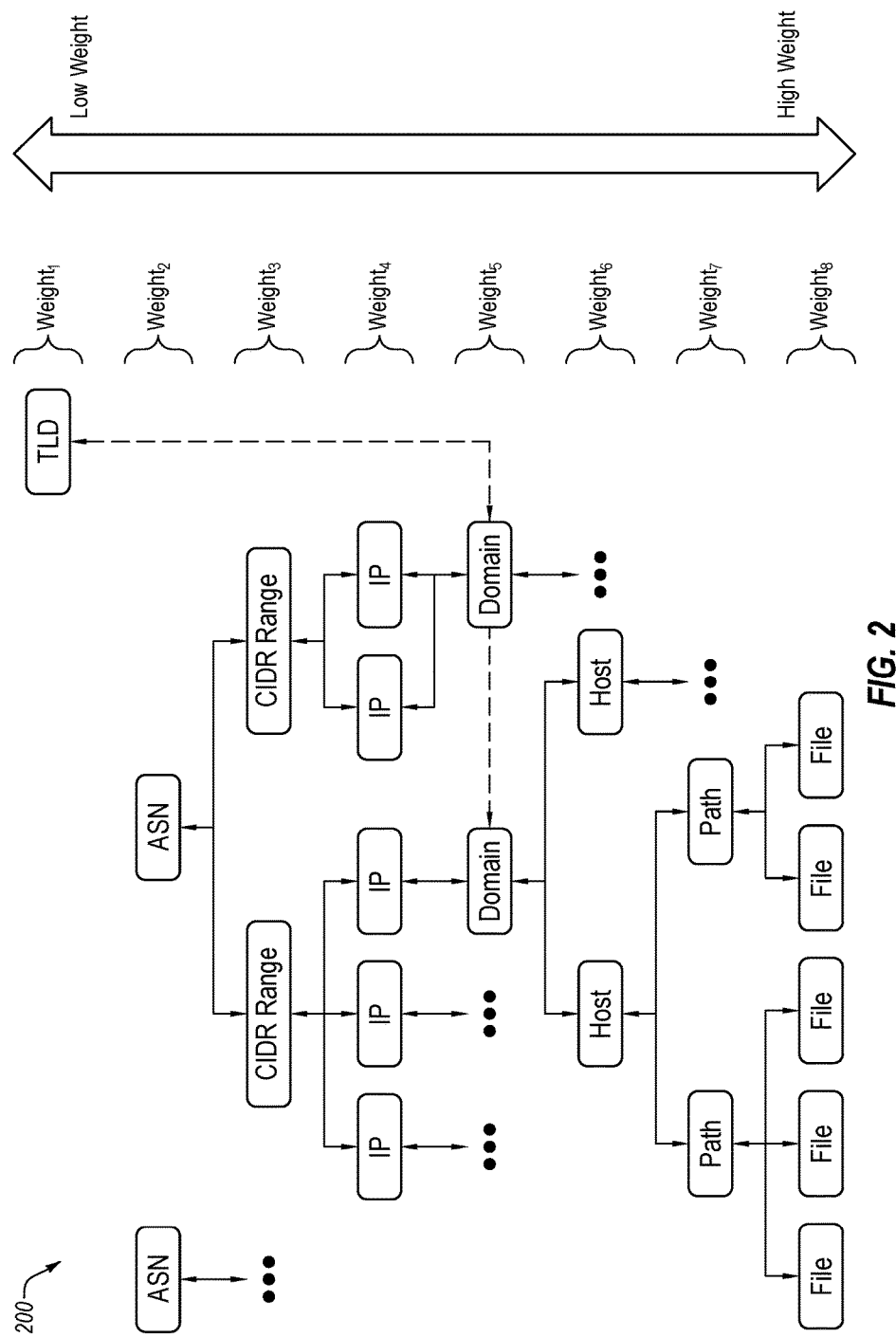
FIG. 2 is a flowchart of an Internet hierarchy having multiple hierarchical levels.

FIG. 2 is a flowchart of an Internet hierarchy 200 having multiple hierarchical levels. In particular, the Internet hierarchy 200 includes eight hierarchical levels, namely, Top Level Domain (TLD), Autonomous System Number (ASN), Classless Inter-Domain Routing (CIDR) Range, Internet Protocol (IP) address, Domain, Host, Path, and File. Further, the eight hierarchical levels of the Internet hierarchy 200 may be associated with $weight_1$-$weight_8$, respectively. Also, the weights corresponding to higher hierarchical levels of the Internet hierarchy 200 may be lower than weights corresponding to lower hierarchical levels of the Internet hierarchy. The $weight_1$-$weight_8$ may be applied to indirect evidence of security risk associated with the corresponding hierarchical level, as discussed below in connection with FIG. 3.

Some embodiments disclosed herein may block malicious Internet content at an appropriate hierarchical level in the Internet hierarchy 200 in order to allow a network device to access benign Internet content and block the network device from accessing malicious Internet content, thus avoiding over-blocking and under-blocking. Further, some embodiments disclosed herein may block malicious Internet content at an appropriate hierarchical level using both indirect and direct evidence, with the indirect evidence being weighted according to the corresponding hierarchical level, thus allowing even hierarchical levels of an Internet hierarchy having no direct evidence to be analyzed and blocked where appropriate.

Modifications, additions, or omissions may be made to the example hierarchical levels of the Internet hierarchy 200 of FIG. 2 without departing from the scope of the present disclosure. For example, although the Internet hierarchy 200 includes eight hierarchical levels in FIG. 2, fewer than eight hierarchical levels, or greater than eight hierarchical levels, may be employed. In one such example, there may be only five hierarchical levels in the Internet hierarchy 200, with the TLD hierarchical level being directly above the Domain hierarchical level, as illustrated by the dashed arrow between the TLD and the Domain in the Internet hierarchy 200.

Figure 3:
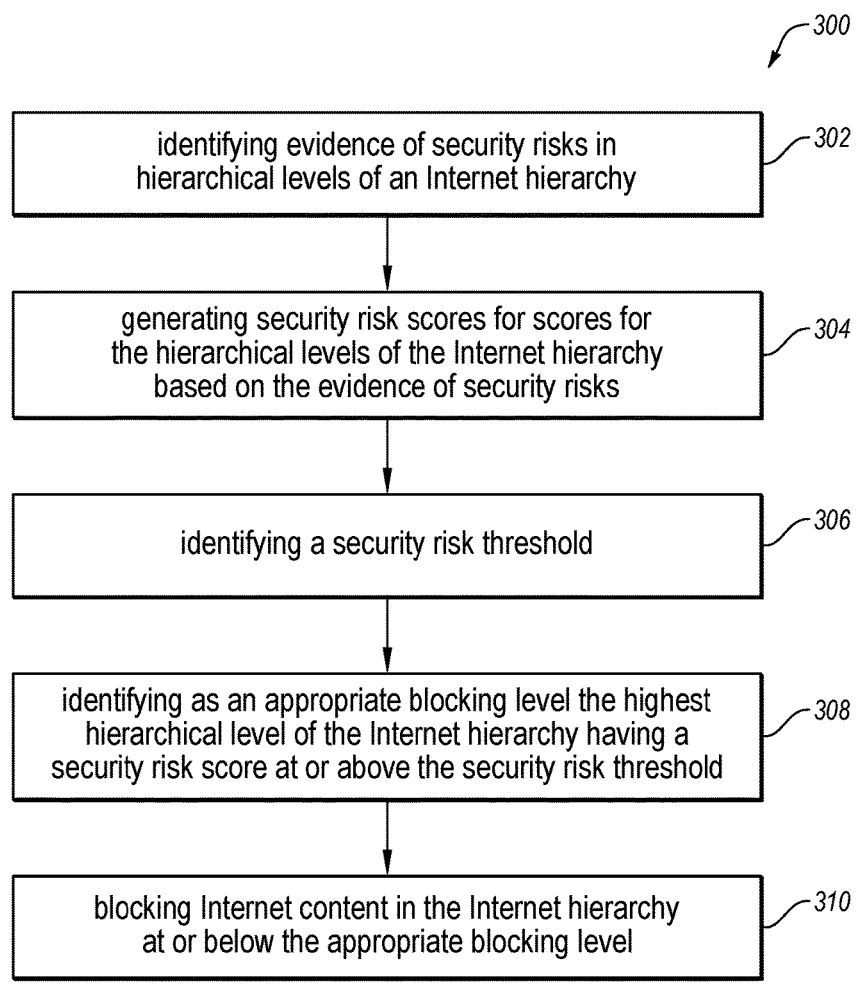
FIG. 3 is a flowchart of an example method for blocking malicious Internet content at an appropriate hierarchical level.

FIG. 3 is a flowchart of an example method 300 for blocking malicious Internet content at an appropriate hierarchical level. The method 300 may be performed, in some embodiments, by a device or system, such as by the security module 108 executing on the security server 106 of FIG. 1. In these and other embodiments, the method 300 may be performed by one or more processors based on one or more computer-readable instructions stored on one or more non-transitory computer-readable media. The method 300 will now be described in connection with FIGS. 1, 2, and 3.

The method 300 may include, at block 302, identifying evidence of security risks in hierarchical levels of an Internet hierarchy. In some embodiments, the hierarchical levels of the Internet hierarchy may include Top Level Domain (TLD), Autonomous System Number (ASN), Classless Inter-Domain Routing (CIDR) Range, Internet Protocol (IP) address, Domain, Host, Path, and File. For example, the security module 108 may identify, at block 302, evidence of security risks in each of the hierarchical levels of the Internet hierarchy 200.

In some embodiments, the identifying at block 302 may include identifying a base hierarchical level of the Internet hierarchy that has a potential security risk, identifying direct evidence of security risks in the base hierarchical level and other hierarchical levels of the Internet hierarchy that are higher than and/or lower than the base hierarchical level, generating indirect evidence of security risks in the base hierarchical level and other hierarchical levels, and combining the direct and indirect evidence of security risks in the base hierarchical level and other hierarchical levels into combined evidence of security risks. In some embodiments, the identifying of the direct evidence of security risks may include identifying the direct evidence of security risks in one or more of telemetry data, traffic log data, historical tracking data, and pre-calculated features. In some embodiments, all direct feature extraction may be performed as a batch so that all direct features are known for every hierarchical level. For example, the security module 108 may, at block 302, identify the Host hierarchical level of the Internet hierarchy 200 as a base hierarchical level that has a potential security risk. Then, the security module 108 may identify direct evidence of security risks in the Host hierarchical level and the other hierarchical levels of the Internet hierarchy that are higher than (i.e., the Domain, IP, CIDR Range, ASN, and TLD hierarchical levels) and/or lower than (i.e., the Path and File hierarchical levels) the Host hierarchical level. In this example, direct evidence of malware at the Host hierarchical level may be identified, as well as direct evidence of malware at other hierarchical levels. The security module 108 may identify the direct evidence in one or more of telemetry data, traffic log data, and historical tracking data, and may perform direct feature extraction to identify the direct evidence. Next, the security module 108 may generate indirect evidence of security risks in the Host hierarchical level and the other hierarchical levels, which may be generated based on the identified direct evidence. In this example, even levels without direct evidence may be analyzed by using the generated indirect evidence. Then, the security module 108 may combine the direct and indirect evidence of security risks in the Host hierarchical level and the other hierarchical levels into combined evidence of security risks, such as by merging feature vectors for each of the hierarchical levels.

In some embodiments, the identifying at block 302 may also include weighting the indirect evidence of security risks based on the hierarchical level to which the indirect evidence corresponds. In these embodiments, the indirect evidence corresponding to higher hierarchical levels of the Internet hierarchy may be weighted lower than the indirect evidence corresponding to lower hierarchical levels of the Internet hierarchy. Also, in these embodiments, the weighting of the indirect evidence of security risks may be accomplished with a modulation via multiplication or by labeling features according to discrete importance. Further, in these embodiments, the weighting of the indirect evidence of security risks may be accomplished using machine learning for classification or regression. For example, the security module 108 may, at block 302, weight the indirect evidence of security risks, using the $weight_1$-$weight_8$, based on the hierarchical level to which the indirect evidence corresponds. The $weight_1$-$weight_8$ may increase, with each successive weight after $weight_1$ being greater than the previous weight, as disclosed in FIG. 2. Further, the security module 108 may accomplish this weighting using machine learning.

The method 300 may include, at block 304, generating security risk scores for the hierarchical levels of the Internet hierarchy based on the evidence of security risks. In some embodiments, the generating at block 304 may include generating security risk scores for the hierarchical levels of the Internet hierarchy based on the combined evidence of security risks. In some embodiments, the generating at block 304 may be accomplished using machine learning. For example, the security module 108 may, at block 304, generate security risk scores on a scale between 0 and 10, with a security risk score of 0 representing the lowest security risk, and a security risk score of 10 representing the highest security risk. The security module 108 may generate these security risk scores for each of the eight hierarchical levels of the Internet hierarchy 200 based on the evidence or combined evidence of security risks from block 302. Further, the security module 108 may accomplish this generating using machine learning.

The method 300 may include, at block 306, identifying a security risk threshold. For example, the security module 108 may, at block 306, identify a security risk threshold of 4, using the same scale between 0 and 10 discussed above in connection with block 304. The identified security risk score may be selected by a system administrator based on risk tolerance or may be automatically selected by the security module 108 based on a derived risk tolerance.

The method 300 may include, at block 308, identifying, as an appropriate blocking level, the highest hierarchical level of the Internet hierarchy having a security risk score at or above the security risk threshold. For example, the security module 108 may, at block 308, examine each of the security risk scores assigned to each of the eight hierarchical levels of the Internet hierarchy 200 and then identify an appropriate blocking level as the highest hierarchical level having a security risk score at or above the security risk threshold of 4. In this example, suppose that the security risk scores for the eight hierarchical levels disclosed in the Internet hierarchy 200 are as follows: TLD—1.5, ASN—1.9, CIDR Range—2.4, IP—2.9, Domain—4.0, Host—4.7, Path—8.3, and File—8.1. Four of these hierarchical levels have security risk scores at or above the security risk threshold of 4 (namely, Domain-4.0, Host-4.7, Path-8.3, and File-8.1), but the highest of these four levels is Domain, so the security module 108 may identify Domain as the appropriate blocking level. In this manner, the security module 108 may automatically identify the highest hierarchical level (i.e., the most course-grain level) that includes malicious Internet content. Further, generating security risk scores for all of the hierarchical levels at block 304 prior to identifying the appropriate blocking level at block 308 may enable the security module 108 to automatically select the most appropriate (e.g., the highest) hierarchical level as the appropriate blocking level.

The method 300 may include, at block 310, blocking a network device from accessing Internet content in the Internet hierarchy at or below the appropriate blocking level. For example, the security module 108 may block, at block 310, the network device 104a from accessing Internet content in the Internet hierarchy at or below the appropriate blocking level of Domain. In this example, all Internet content at the Host, Path, and File hierarchical levels beneath the Domain will be blocked in addition to the Internet content at the particular Domain hierarchical level.

The method 300 may thus be employed, in some embodiments, to block any of the network devices 104a-104n from accessing malicious Internet content in the Internet hierarchy 200 at or below an appropriate hierarchical level. Some embodiments of the method 300 may avoid over-blocking and under-blocking, thus allowing the network devices 104a-104n to access benign Internet content and blocking the network devices 104a-104n from accessing malicious Internet content. Further, some embodiments of the method 300 may generate indirect evidence in order to analyze hierarchical levels of the Internet hierarchy 200 that have no direct evidence, thus allowing blocking at these hierarchical levels where appropriate.

Although the blocks of the method 300 are illustrated in FIG. 3 as discrete blocks, various blocks may be divided into additional blocks, combined into fewer blocks, reordered, expanded, or eliminated, depending on the desired implementation. For example, in some embodiments, blocks 302-308 may be performed without performing block 310. Also, in some embodiments, block 310 may be performed by a network administrator or other entity that is different from the entity performing the other blocks of the method 300. Further, in some embodiments, blocks 302-308 may be performed in parallel with the performance of block 310.

Further, it is understood that the method 300 may improve the functioning of a network environment. For example, the functioning of the security server 106 or any of the network devices 104a-104n of FIG. 1 may itself be improved by the method 300. For example, any of these computer systems may be improved by analyzing multiple hierarchical levels, including hierarchical levels with no direct evidence of malicious Internet content, before identifying an appropriate hierarchical level for blocking malicious Internet content. The method 300 may thus result in the securing of the network devices 104a-104n from accessing malicious content in a more effective manner than conventional methods which are only able to evaluate security risks at a single hierarchical level and only able to evaluate security risks where the single hierarchical level has direct evidence of malicious Internet content.

Also, the method 300 may improve the technical field of malicious Internet content and securing network devices. Analyzing multiple hierarchical levels and/or analyzing hierarchical levels having no direct evidence of malicious Internet content is an improvement over conventional methods which are only able to evaluate security risks at a single hierarchical level and only able to evaluate security risks where the single hierarchical level has direct evidence of malicious Internet content.

FIG. 4 illustrates an example computer system 400 that may be employed in blocking malicious Internet content at an appropriate hierarchical level. In some embodiments, the computer system 400 may be part of any of the systems or devices described in this disclosure. For example, the computer system 400 may be part of any of the network devices 104a-104n or the security server 106 of FIG. 1.

The computer system 400 may include a processor 402, a memory 404, a file system 406, a communication unit 408, an operating system 410, a user interface 412, and a security module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more blocks of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more blocks of the method 300 of FIG. 3. These computer-executable instructions may be included, for example, in the operating system 410, in one or more applications, such as the security module 414, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The security module 414 may be one or more computer-readable instructions stored on one or more non-transitory computer-readable media, such as the memory 404 or the file system 406, that, when executed by the processor 402, is configured to perform one or more blocks of the method 300 of FIG. 3. In some embodiments, the security module 414 may be part of the operating system 410 or may be part of an application of the computer system 400, or may be some combination thereof. In some embodiments, the security module 414 may function as the security module 108 of FIG. 1.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for blocking malicious Internet content at an appropriate hierarchical level, at least a portion of the method being performed by a computing device comprising at least one processor, the method comprising:
    identifying evidence of security risks in hierarchical levels of an Internet hierarchy;
    generating security risk scores for the hierarchical levels of the Internet hierarchy based on the evidence of security risks;
    identifying a security risk threshold;
    identifying, as an appropriate blocking level, the highest hierarchical level of the Internet hierarchy having a security risk score at or above the security risk threshold; and
    blocking a network device from accessing Internet content in the Internet hierarchy at or below the appropriate blocking level.

2. The method of claim 1, wherein the hierarchical levels of the Internet hierarchy comprise Top Level Domain (TLD), Autonomous System Number (ASN), Classless Inter-Domain Routing (CIDR) Range, Internet Protocol (IP) address, Domain, Host, Path, and File.

3. The method of claim 1, wherein the generating of the security risk scores for the hierarchical levels of the Internet hierarchy based on the evidence of security risks is accomplished using machine learning.

4. The method of claim 1, wherein the evidence of security risks comprises direct evidence.

5. The method of claim 4, wherein the evidence of security risks further comprises indirect evidence.

6. The method of claim 5, further comprising:
    weighting the indirect evidence of security risks based on the hierarchical level to which the indirect evidence corresponds.

7. The method of claim 6, wherein the indirect evidence corresponding to higher hierarchical levels of the Internet hierarchy are weighted lower than the indirect evidence corresponding to lower hierarchical levels of the Internet hierarchy.

8. A computer-implemented method for blocking malicious Internet content at an appropriate hierarchical level, at least a portion of the method being performed by a computing device comprising at least one processor, the method comprising:
    identifying a base hierarchical level of an Internet hierarchy that has a potential security risk;
    identifying direct evidence of security risks in the base hierarchical level and other hierarchical levels of the Internet hierarchy that are higher than and/or lower than the base hierarchical level;
    generating indirect evidence of security risks in the base hierarchical level and other hierarchical levels;
    combining the direct and indirect evidence of security risks in the base hierarchical level and other hierarchical levels into combined evidence of security risks;
    generating security risk scores for the hierarchical levels of the Internet hierarchy based on the combined evidence of security risks;
    identifying a security risk threshold;
    identifying, as an appropriate blocking level, the highest hierarchical level of the Internet hierarchy having a security risk score at or above the security risk threshold; and
    blocking a network device from accessing Internet content in the Internet hierarchy at or below the appropriate blocking level.

9. The method of claim 8, wherein the hierarchical levels of the Internet hierarchy comprise Top Level Domain (TLD), Autonomous System Number (ASN), Classless Inter-Domain Routing (CIDR) Range, Internet Protocol (IP) address, Domain, Host, Path, and File.

10. The method of claim 8, wherein the generating of the security risk scores for the hierarchical levels of the Internet hierarchy based on the combined evidence of security risks is accomplished using machine learning.

11. The method of claim 8, further comprising:
weighting the indirect evidence of security risks based on the hierarchical level to which the indirect evidence corresponds.

12. The method of claim 11, wherein the indirect evidence corresponding to higher hierarchical levels of the Internet hierarchy are weighted lower than the indirect evidence corresponding to lower hierarchical levels of the Internet hierarchy.

13. The method of claim 11, wherein the weighting of the indirect evidence of security risks is accomplished using machine learning.

14. The method of claim 8, wherein the identifying of the direct evidence of security risks comprises identifying the direct evidence of security risks in one or more of telemetry data, traffic log data, and historical tracking data.

15. One or more non-transitory computer-readable media comprising one or more computer-readable instructions that, when executed by one or more processors of one or more computing devices, cause the one or more computing devices to perform a method for blocking malicious Internet content at an appropriate hierarchical level, the method comprising:
identifying evidence of security risks in hierarchical levels of an Internet hierarchy;
generating security risk scores for the hierarchical levels of the Internet hierarchy based on the evidence of security risks;
identifying a security risk threshold;
identifying, as an appropriate blocking level, the highest hierarchical level of the Internet hierarchy having a security risk score at or above the security risk threshold; and
blocking a network device from accessing Internet content in the Internet hierarchy at or below the appropriate blocking level.

16. The one or more non-transitory computer-readable media of claim 15, wherein the hierarchical levels of the Internet hierarchy comprise Top Level Domain (TLD), Autonomous System Number (ASN), Classless Inter-Domain Routing (CIDR) Range, Internet Protocol (IP) address, Domain, Host, Path, and File.

17. The one or more non-transitory computer-readable media of claim 15, wherein the generating of the security risk scores for the hierarchical levels of the Internet hierarchy based on the evidence of security risks is accomplished using machine learning.

18. The one or more non-transitory computer-readable media of claim 15, wherein the evidence of security risks comprises direct evidence.

19. The one or more non-transitory computer-readable media of claim 18, wherein the evidence of security risks further comprises indirect evidence.

20. The one or more non-transitory computer-readable media of claim 19, wherein:
the method further comprises weighting the indirect evidence of security risks based on the hierarchical level to which the indirect evidence corresponds; and
the indirect evidence corresponding to higher hierarchical levels of the Internet hierarchy are weighted lower than the indirect evidence corresponding to lower hierarchical levels of the Internet hierarchy.

* * * * *